UNITED STATES PATENT OFFICE.

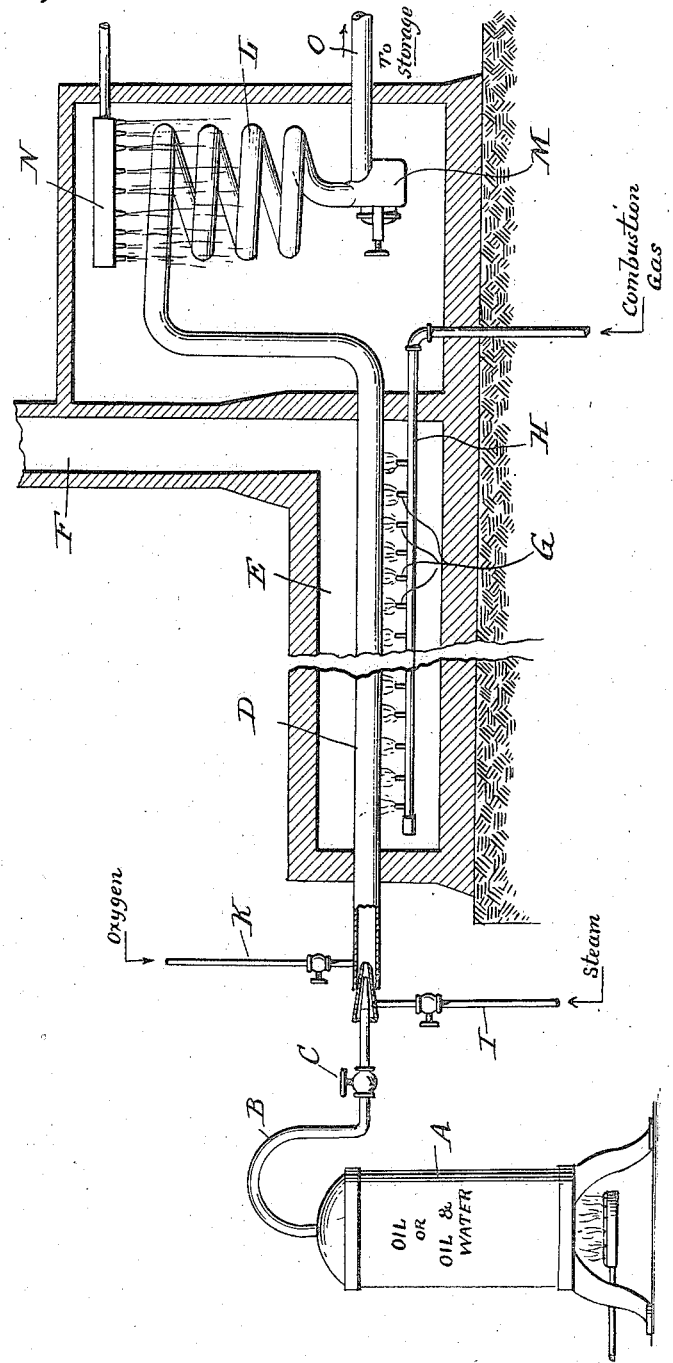

RAOUL PIERRE PICTET, OF WILMERSDORF, NEAR BERLIN, GERMANY.

MANUFACTURING OF CARBON MONOXID AND HYDROGEN.

1,228,818.  Specification of Letters Patent.  Patented June 5, 1917.

Original application filed May 29, 1911, Serial No. 630,177. Divided and this application filed July 1, 1912. Serial No. 707,034.

*To all whom it may concern:*

Be it known that I, RAOUL PIERRE PICTET, a citizen of the Swiss Republic, residing at 116 Uhlandstrasse, Wilmersdorf, near Berlin, Germany, have invented certain new and useful Improvements in the Manufacturing of Carbon Monoxid and Hydrogen; and I do hereby declare the following to be a full, clear, and exact description of the invention, such as will enable others skilled in the art to which it appertains to make and use the same.

In my application for patent filed May 29, 1911, Serial No. 630,177, and of which this application is a division, I have described the manufacture of hydrogen from hydrocarbons, such as petroleum, crude oil, lubricating oils, solar oils, paraffin oils or gasolene, etc., by passing their vapors through a highly heated tube.

For many industrial purposes pure hydrogen is either not necessary or not desirable, and a mixture of hydrogen and carbon monoxid is preferred to pure hydrogen.

In the application above referred to I increase the yield of available gas produced, at the same time increasing the quantity of hydrogen produced with the use of the starting materials described, by using in conjunction with such starting materials oxids of hydrogen, $H_2O$, $H_2O_2$ the latter being water and oxygen.

Oxygen combines with carbon at high temperatures to form carbon-monoxid, and instead of using oxygen alone, or air, it is advantageous to use oxids or their equivalents, which under the action of heat will increase the quantity of hydrogen in the resulting gas.

The substances are decomposed by the high heat, the oxygen uniting with the carbon of the hydrocarbon vapor used, to form carbon-monoxid, and the hydrogen remaining unchanged and increasing the volume of hydrogen obtainable from the hydrocarbon alone.

The hydrocarbon or oils may be vaporized separately from the water, or it may be mixed with the water, and if desired, the required quantity of oxygen may be supplied to the mixture, when $H_2O_2$ is desired to be used with the hydrocarbon.

I also proceed by introducing the hydrocarbon vapor at one end of the pipe separately from the water vapor (steam) which may or may not be mixed with oxygen. Good results are obtained by separately supplying the hydrocarbon vapor, steam and oxygen to the inlet end of the heated decomposing pipe, the relative proportions of which, however, should be regulated so that the resulting gas will be a mixture of hydrogen and carbon monoxid.

The pipe, preferably of iron in the commercial process, is heated to near its melting point.

If petroleum be the type of hydrocarbon used, 1 kg. of petroleum will produce about 700 g. of soot (carbon), about 200 g. of pure hydrogen, and about 100 g. of heavy vapors of hydrocarbon which are not decomposed at the temperature of about the melting point of carbon.

700 g. of carbon require when heated with oxygen, as is well known, 933 g. of oxygen to convert it into carbon monoxid. Now when 1050 g. of water is decomposed, there is produced 933 g. of oxygen and 117 g. of hydrogen. Each gram molecule of water requires 68.36 calories of heat to effect its decomposition, and each gram molecule of carbon monoxid produces, during its formation 29 calories.

In using 1 kg. of petroleum for producing hydrogen and carbon monoxid with the aid of 1050 g. of water, so as to cause the 700 g. of carbon to combine with 933 g. of oxygen to form 1603 g. carbon monoxid, 2294 calories will have to be supplied through the walls of the iron pipe in which the reaction is performed.

This quantity of heat, namely 2294 calories, must be supplied through the walls of the tube or pipe in addition to the heat required for converting the petroleum vapor into carbon and methane and the methane into carbon and hydrogen.

The pipe that is employed, for example, iron pipe, must of course be lengthened in proportion to the quantity of heat to be supplied. If it were wished to supply the heat, 2294 calories, through the walls of a short pipe by increasing the temperature by a more intense furnace, it could not be done because the pipe would be melted. Consequently the pipe must have a length in proportion to the quantity of heat to be supplied.

When using water and petroleum 1 kg. of petroleum and 1050 g. of water are simultaneously allowed to flow into a boiler. These two substances are then vaporized and their mixed vapors are caused to flow through an iron pipe heated almost to its melting point. The following maximum quantities of substances will be obtained:

By the decomposition of the methane from the petroleum, 2220 l. of hydrogen; by the decomposition of the steam, 1300 l. of hydrogen; by the combustion of 700 g. of carbon, 1633 or 1307 l. of carbon monoxid, there being a residue of 100 g. of undecomposed coal tar oils.

The total volume of the gas mixture finally obtained from 1 kg. of petroleum is 4827 l. composed of 3520 l. of hydrogen and 1307 carbon monoxid calculated at 0° C. and 760 mm.

The buoyancy of the gas mixture is 0.887 g. per liter, and the specific weight 0.406.

The heat of combustion of the gas mixture is 3022 calories per cu. m.

This mixture of gases is advantageously used for autogenous welding, because the carbon monoxid has a high reducing action.

An important advantage of my process consists in the possibility, by regulating the supply of water, of forming any desired quantity of carbon monoxid from the carbon in the petroleum, the remaining uncombined carbon settling in the condenser into which the pipe discharges.

When using peroxid of hydrogen or, preferably, its equivalent, water vapor and oxygen, the quantity of uncombined carbon due to the use of a quantity of water less than that sufficent to convert all the carbon into carbon monoxid or otherwise, will be reduced.

It has also been found that complete conversion of carbon to carbon monoxid does not take place because, on the one hand the temperature of decomposition of the steam in the presence of finely divided carbon, is higher than that of the hydrocarbons, and, on the other hand, a deficit of 30 calories is obtained owing to the heat absorbed by each gram molecule of water entering the pipe in the form of steam.

By the use of the higher oxid of hydrogen, that is, by the use of oxygen in addition to steam, the temperature of the pipe need not be kept too close to its melting point, and thereby a safer commercial operation is provided, by lessening the danger of burning out the apparatus.

It has been observed that at about 1300° C., 20–25% of the water supplied is converted into gas. If the temperature approaches 1400°–1500° C., the proportion is increased two-fold or three-fold, i. e., almost complete conversion of the water into gas takes place.

The hydrocarbon vapor and the steam mixed with oxygen are supplied to the hot pipe at points adjacent one another and to the entrance to the pipe. The mixture of steam and oxygen should be as regulable as possible.

The following takes place:

Each molecule of oxygen charged with water (steam) comes into contact with the vaporous hydrocarbon molecules, that have already been or are being decomposed to form carbon in *statu nascendi*. This very hot carbon is capable of decomposing the water and at the same time forms carbon monoxid. As the carbon in the initial portion of the tube is in excess, each gram molecule of carbon monoxid formed from the oxygen and the oxygen of the decomposed water supplies 29 calories.

When a suitable quantity of oxygen is supplied, all the carbon can be converted into carbon monoxid without having to increase the internal temperature of the pipe. The heat consumed by the decomposition of the water is supplied by the heat of formation of the carbon monoxid. In practice, therefore, the pipe need only be heated to the temperature sufficient for the decomposition of the hydrocarbon, about 1350° C.

The fire surrounding the pipe has merely to supply the heat necessary to raising the vapors entering the pipe to the decomposition temperature of the hydrocarbon. As all the chemical reactions taking place in the pipe mutually bring about thermal equilibrium, the external temperature of the pipe will be considerably lower than when no oxygen is supplied to it, and the danger of melting the pipe is decreased, and it may also be made shorter.

The resulting gas mixture is composed of hydrogen and carbon monoxid with but small quantities of nitrogen and carbon dioxid. I believe I am the first to produce such a mixture by a continuous process.

Oxygen made from any source may be used, but that obtained by the distillation of liquid air has been found particularly suitable for the purpose.

In the drawing, which is a diagrammatic view of an apparatus, A is the boiler in which the oil or oil and water is placed to supply the oil vapor or mixed oil vapor and steam through a pipe B provided with a valve C to the decomposing pipe D. This pipe D is placed in a suitable furnace chamber E provided with an exit F for products of combustion. The pipe D is heated by burners G supplied with combustion gas by a pipe H.

A separate steam supply pipe I and oxygen supply pipe K are provided, as shown, to simultaneously or independently supply steam and oxygen.

The decomposition pipe D is connected to and discharges into a coil L having a sludge chamber M. The coil L is cooled by a water spray N and discharges at O into a suitable storage vessel.

I claim—

1. A process for manufacturing a hydrogen-carbon monoxid mixture from hydrocarbonaceous material, which comprises simultaneously admitting said material, steam and oxygen to a conduit heated sufficiently to decompose the steam and hydrocarbon.

2. A process for the manufacture of a hydrogen-carbon monoxid mixture from hydrocarbonaceous material, which comprises simultaneously admitting said material, steam, and oxygen to a conduit heated sufficiently to decompose the steam and hydrocarbon and initiate the reaction, the oxygen being sufficient to produce the heat of oxidation of the carbon required to establish the equilibrium of the reaction.

In testimony that I claim the foregoing as my invention I have signed my name in presence of two subscribing witnesses.

RAOUL PIERRE PICTET.

Witnesses:
 AUGUST O. PICTET,
 HERBERT D. JAMESON.